United States Patent
Nanahara et al.

(10) Patent No.: US 9,366,354 B2
(45) Date of Patent: Jun. 14, 2016

(54) NORMALLY CLOSED SOLENOID VALVE

(75) Inventors: Masaki Nanahara, Toyota (JP); Yoshito Tanaka, Miyoshi (JP); Kei Sato, Kasugai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 7 days.

(21) Appl. No.: 14/386,158

(22) PCT Filed: Jun. 12, 2012

(86) PCT No.: PCT/JP2012/065037
§ 371 (c)(1),
(2), (4) Date: Sep. 18, 2014

(87) PCT Pub. No.: WO2013/186859
PCT Pub. Date: Dec. 19, 2013

(65) Prior Publication Data
US 2015/0041694 A1   Feb. 12, 2015

(51) Int. Cl.
*F16K 31/06* (2006.01)
*F16K 1/52* (2006.01)

(52) U.S. Cl.
CPC ............. *F16K 31/0658* (2013.01); *F16K 1/523* (2013.01); *F16K 31/0655* (2013.01); *F16K 31/0665* (2013.01)

(58) Field of Classification Search
CPC ............ F16K 31/0658; F16K 31/0655; F16K 31/0665; F16K 1/523
USPC .................................... 251/129.18, 285, 337
See application file for complete search history.

(56) References Cited

U.S. PATENT DOCUMENTS

| | | | | |
|---|---|---|---|---|
| 2,820,604 A | * | 1/1958 | Ray | F16K 31/02 251/129.18 |
| 4,530,486 A | * | 7/1985 | Rusnak | F16K 31/0655 251/129.18 |
| 5,110,087 A | * | 5/1992 | Studtmann | H01F 7/13 251/129.18 |
| 5,284,317 A | * | 2/1994 | Brehm | G05D 16/2013 251/129.15 |
| 5,548,263 A | * | 8/1996 | Bulgatz | F01L 9/04 251/129.18 |
| 5,586,747 A | * | 12/1996 | Bennardo | F16K 31/0658 251/129.18 |

(Continued)

FOREIGN PATENT DOCUMENTS

| | | |
|---|---|---|
| JP | 58-015661 B2 | 3/1983 |
| JP | 63-076971 A | 4/1988 |

(Continued)

OTHER PUBLICATIONS

International Search Report issued Aug. 14, 2012 in PCT/JP2012/065037 filed Jun. 12, 2012.

*Primary Examiner* — John Bastianelli
(74) *Attorney, Agent, or Firm* — Oblon, McClelland, Maier & Neustadt, L.L.P.

(57) ABSTRACT

A normally closed solenoid valve includes a valve element arranged to be seatable on and unseatable from a valve seat. A movable core is movable with the valve element. A first spring biases the valve element and the movable core toward the valve seat. A coil and a stator core generate an electromagnetic force resistive to a load of the first spring for the movable core. A second spring applies a load smaller than and resistive to the load of the first spring to the valve element and the movable core. The valve further includes a load adjusting mechanism for adjusting the load of the first spring, and a stroke adjusting mechanism for adjusting an unseating stroke of the valve element from the valve seat.

4 Claims, 7 Drawing Sheets

(56) References Cited

U.S. PATENT DOCUMENTS

| | | | | |
|---|---|---|---|---|
| 5,645,019 | A * | 7/1997 | Liang | F01L 9/04 251/129.18 |
| 5,901,941 | A * | 5/1999 | Ricco | F02M 47/027 239/585.3 |
| 6,152,387 | A * | 11/2000 | Ricco | F02M 47/027 251/129.18 |
| 6,155,534 | A * | 12/2000 | Steinruck | F16K 31/0655 251/129.18 |
| 6,161,813 | A * | 12/2000 | Baumgartner | F02M 47/027 251/129.18 |
| 6,409,145 | B1 * | 6/2002 | Fong | F16K 31/0665 251/129.18 |
| 6,619,617 | B2 * | 9/2003 | Ricco | F02M 47/027 251/129.19 |
| 6,899,313 | B2 * | 5/2005 | Carrillo | F16K 31/0665 251/129.18 |
| 6,938,875 | B2 * | 9/2005 | Ichinose | F16K 31/0665 251/285 |
| 6,994,312 | B2 * | 2/2006 | Pauer | F02M 63/0015 251/285 |
| 7,766,037 | B2 * | 8/2010 | Moenkhaus | F16K 31/0655 251/285 |
| 7,871,058 | B2 * | 1/2011 | Robinson | B05C 5/0225 251/129.18 |
| 2008/0149071 | A1 | 6/2008 | Ogawa et al. | |

FOREIGN PATENT DOCUMENTS

| | | |
|---|---|---|
| JP | 64-035273 U | 3/1989 |
| JP | 10-076927 A | 3/1998 |
| JP | 2001-041340 A | 2/2001 |
| JP | 2005-291361 A | 10/2005 |
| JP | 2008-151082 A | 7/2008 |

* cited by examiner

NORMALLY CLOSED SOLENOID VALVE

TECHNICAL FIELD

The present invention relates to a normally closed solenoid valve, and more particularly, to a normally closed solenoid valve capable of performing fine pressure control and flow control.

BACKGROUND ART

The normally closed solenoid valve of this type is disclosed in, for example, JP 2005-291361 A. The normally closed solenoid valve disclosed in JP 2005-291361 A includes a housing (having an inflow port and an outflow port for a fluid, a passage for communicating the ports to each other, and a valve orifice formed in the passage with a valve seat arranged at one end portion of the valve orifice), a valve element (arranged so as to be seatable on and unseatable from the valve seat and configured to receive a force of the fluid flowing from the inflow port to the outflow port in a direction in which the valve element is separated away from the valve seat (unseating direction)), a movable core (linked to the valve element and assembled to a cylinder section of the housing so as to be movable in an axial direction), a first spring (configured to bias the movable core toward the valve seat), and a coil and a stator core (configured to generate an electromagnetic force resistive to a load (biasing force) of the first spring for the movable core through energization). The normally closed solenoid valve further includes a second spring (arranged between the valve element and the movable core to link the valve element and the movable core to each other, and configured to bias the valve element toward the valve seat and bias the movable core toward the stator core (bias the movable core against the load of the first spring)).

CITATION LIST

Patent Literature

[PTL 1] JP 2005-291361 A

SUMMARY OF INVENTION

In the normally closed solenoid valve disclosed in JP 2005-291361 A, the valve element seatable on and unseatable from the valve seat is configured to receive the force of the fluid flowing from the inflow port to the outflow port of the housing in the unseating direction. Further, the second spring arranged between the valve element and the movable core to link the valve element and the movable core to each other is configured to bias the valve element toward the valve seat and bias the movable core toward the stator core.

Therefore, in fluid control for a flow in a self-opening direction (that is, a flow of the fluid in a case where the force of the fluid flowing from the inflow port to the outflow port of the housing is to be received by the valve element in the unseating direction), the above-mentioned force of the fluid, loads (biasing forces) of both the springs, electromagnetic force (force increased and decreased in accordance with an energization current to the coil), and the like are balanced, with the result that fine pressure control and flow control can be performed. In fluid control for a flow in a self-closing direction (that is, a flow of the fluid in a case where the force of the fluid flowing from the inflow port to the outflow port of the housing is to be received by the valve element in a seating direction), however, the above-mentioned force of the fluid, loads of both the springs, electromagnetic force, and the like are not balanced (the above-mentioned force of the fluid and load of the second spring are applied to the valve element toward the valve seat, and hence the valve element is not unseated from the valve seat even when the electromagnetic force is adjusted in any way), with the result that the fine pressure control and flow control cannot be performed.

The present invention has been made to solve the above-mentioned problems (that is, to provide a normally closed solenoid valve capable of performing fine pressure control and flow control not only in fluid control for a flow in a self-opening direction, but also in fluid control for a flow in a self-closing direction).

According to one embodiment of the present invention, there is provided a normally closed solenoid valve, including:
  a housing having an inflow port and an outflow port for a fluid, a passage for communicating the inflow port and the outflow port to each other, and a valve orifice formed in the passage with a valve seat arranged at one end portion of the valve orifice;
  a valve element arranged so as to be seatable on and unseatable from the valve seat;
  a movable core arranged inside of a cylinder section of the housing so as to be movable integrally with the valve element in an axial direction of the movable core;
  a first spring configured to bias the valve element and the movable core toward the valve seat;
  a coil and a stator core configured to generate an electromagnetic force resistive to a load of the first spring for the movable core through energization;
  a second spring configured to apply a load smaller than and resistive to the load of the first spring to the valve element and the movable core;
  a load adjusting mechanism capable of adjusting the load (mounting load) of the first spring; and
  a stroke adjusting mechanism capable of adjusting an unseating stroke of the valve element from the valve seat.

In the normally closed solenoid valve according to one embodiment of the present invention, the valve element and the movable core are assembled to the cylinder section of the housing so as to be integrally movable in the axial direction. Further, the load of the second spring is smaller than the load of the first spring, and is applied to the valve element and the movable core against the load of the first spring. Therefore, in the normally closed solenoid valve according to one embodiment of the present invention, not only in the fluid control for the flow in the self-opening direction, but also in the fluid control for the flow in the self-closing direction, the electromagnetic force is generated through the energization of the coil, and the valve element and the movable core integrally move against the load of the first spring, with the result that the valve element is unseated from the valve seat.

Further, in the normally closed solenoid valve according to one embodiment of the present invention, the load adjusting mechanism is capable of adjusting the load of the first spring, and the stroke adjusting mechanism is capable of adjusting the unseating stroke of the valve element from the valve seat (which may hereinafter be referred to simply as "stroke"). Thus, in the normally closed solenoid valve according to one embodiment of the present invention, not only in the fluid control for the flow in the self-opening direction, but also in the fluid control for the flow in the self-closing direction, the above-mentioned force of the fluid, loads of both the springs, electromagnetic force, and the like are balanced, with the result that fine pressure control and flow control can be performed through fine adjustment using the electromagnetic force.

When carrying out the invention described above, the load of the second spring may be set to zero before the unseating stroke of the valve element from the valve seat becomes maximum (before the maximum stroke is obtained). In this case, the load of the first spring at the time when the unseating stroke of the valve element from the valve seat becomes the maximum (at the time of maximum stroke) can be set lower than, for example, in a case where the load of the second spring is set to zero at the time of maximum stroke. Thus, the electromagnetic force necessary to obtain the maximum stroke of the valve element and the movable core (necessary current) can be reduced, with the result that the normally closed solenoid valve can be constructed into a power-saving type.

Further, when carrying out the invention described above, the one end portion side of the valve orifice (valve seat side) may communicate to the inflow port, and another end portion side of the valve orifice may communicate to the outflow port. In this case, cavitation and erosion may occur on a downstream side with respect to a seal portion (portion at which the valve element is seated on the valve seat), and hence the erosion can be prevented from occurring in the vicinity of the seal portion, with the result that the normally closed solenoid valve can be constructed into an anti-erosion type (damage to the seal portion can be suppressed and the life of the normally closed solenoid valve can therefore be prolonged).

BRIEF DESCRIPTION OF DRAWINGS

FIG. 7(a) is a view illustrating a state in which the valve element is seated on the valve seat (state in which the stroke is zero). FIG. 7(b) is a view illustrating a state in which the valve element is unseated from the valve seat (state in which the stroke is the maximum).

DESCRIPTION OF EMBODIMENTS

Figure 1:
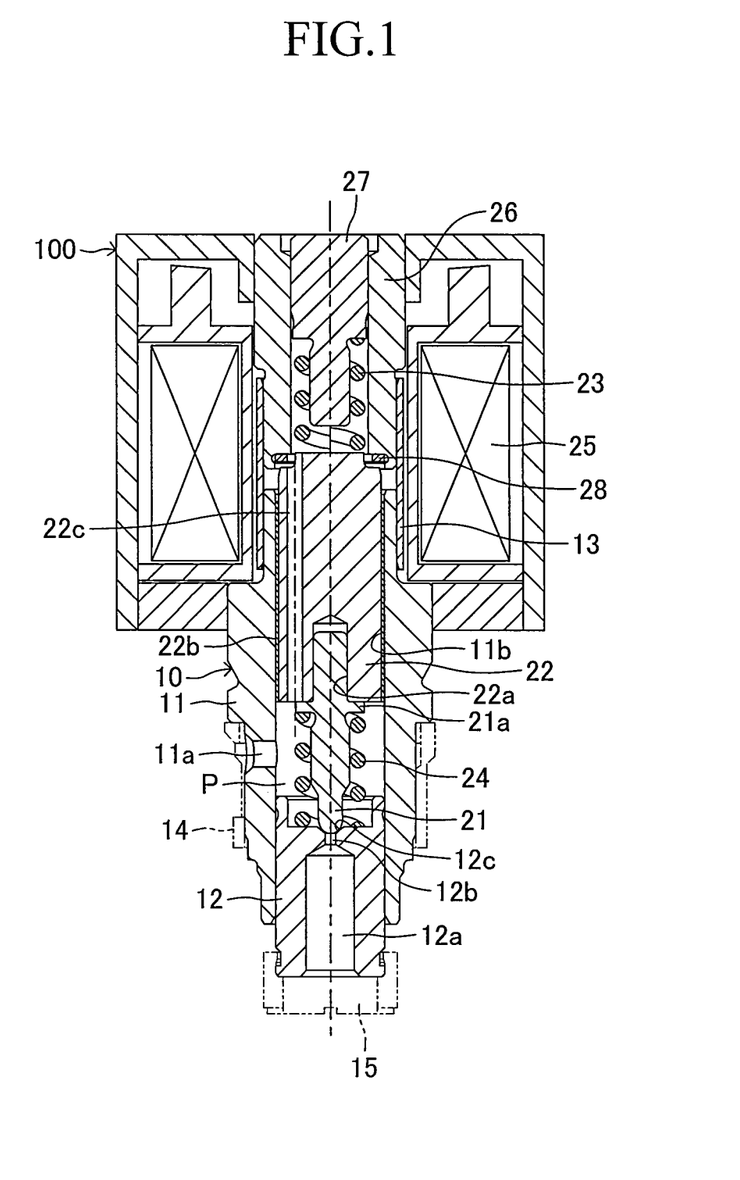
FIG. 1 is a vertical sectional view illustrating a normally closed solenoid valve according to an embodiment of the present invention.

Now, embodiments of the present invention are described with reference to the drawings. FIG. 1 illustrates a normally closed solenoid valve according to an embodiment of the present invention. A normally closed solenoid valve 100 of this embodiment is assembled to, for example, a hydraulic pressure control device of a hydraulic brake apparatus for a vehicle, and is used for controlling a hydraulic pressure of a brake fluid. The normally closed solenoid valve 100 includes a valve element 21, a movable core 22, a first spring 23, a second spring 24, a coil 25, a stator core 26, and other components, which are assembled to a housing 10.

The housing 10 includes a cylindrical guide member 11, a cylindrical seat member 12 assembled to an inner periphery of a lower end portion of the guide member 11 in FIG. 1 so that the position of the seat member 12 is adjustable in a vertical direction, and a sleeve 13 assembled to an outer periphery of an upper end portion of the guide member 11 in FIG. 1 in an immovable manner. The guide member 11 is made of a magnetic material, and has an inflow port 11a for the fluid, which is formed at a lateral side of an intermediate portion of the guide member 11. The seat member 12 is made of a non-magnetic material. The seat member 12 has an outflow port 12a for the fluid, which is formed at an axially center portion of the seat member 12, and also has a valve orifice 12b and a valve seat 12c, which are formed coaxially with the outflow port 12a. The sleeve 13 is made of a non-magnetic material. The sleeve 13 is fixed, at a lower end portion in FIG. 1, to the upper end portion of the guide member 11, and is fixed, at an upper end portion in FIG. 1, to a lower end portion of the stator core 26.

The inflow port 11a and the outflow port 12a for the fluid are communicable to each other through a passage P formed in the housing 10. In the passage P, the valve orifice 12b is formed with the valve seat 12c arranged at one end portion thereof (upper end portion in FIG. 1). Further, filters 14 and 15 are fixed to the inflow port 11a and the outflow port 12a, respectively. Therefore, in this embodiment, when the normally closed solenoid valve 100 is opened (when the valve element 21 is separated away from the valve seat 12c upwardly), the fluid (brake fluid) flowing in the inflow port 11a through the filter 14 flows to the outflow port 12a through the valve seat 12c and the valve orifice 12b formed in the passage P (flows in a self-closing direction), and flows to the outside of the housing 10 through the filter 15.

The valve element 21 is made of a non-magnetic material, and is arranged so as to be seatable on and unseatable from the valve seat 12c (movable upwardly and downwardly in FIG. 1). The valve element 21 is fitted and fixed into a mounting hole 22a formed at a lower end portion of the movable core 22, and is movable integrally with the movable core 22. The movable core 22 is made of a magnetic material, and is assembled to a cylinder section 11b of the guide member 11 (housing 10) so as to be movable in an axial direction (slidable in the vertical direction in FIG. 1). Note that, a thin sleeve 22b made of a non-magnetic material is assembled to an outer periphery of the movable core 22, and hence the movability (slidability) of the movable core 22 with respect to the cylinder section 11b is excellent. The movable core 22 has a communication hole 22c for communicating a lower end (lower fluid chamber) to an upper end (upper fluid chamber) in FIG. 1.

The first spring 23 is configured to bias the valve element 21 and the movable core 22 toward the valve seat 12c. The first spring 23 is interposed between an adjustment core 27 and the movable core 22. The adjustment core 27 is assembled to an inner periphery of an upper portion of the stator core 26 in FIG. 1 so that the position of the adjustment core 27 is adjustable in the vertical direction. A mounting load of the first spring 23 (biasing force for biasing the valve element 21 and the movable core 22 in a downward direction of the drawing sheet under a state of FIG. 1) has a set value f1 (see FIG. 2(a)).

The second spring 24 is configured to apply a load smaller than and resistive to the load of the first spring 23 to the valve element 21 and the movable core 22 (configured to bias the valve element 21 and the movable core 22 in such a direction that the valve element 21 and the movable core 22 are separated away from the valve seat 12c). The second spring 24 is interposed between the seat member 12 (housing 10) and a flange section 21a of the valve element 21. A mounting load of the second spring 24 (biasing force for biasing the valve element 21 and the movable core 22 in an upward direction of the drawing sheet under a state of FIG. 1) has a set value f2 (f1>f2; see FIG. 2(a)).

The coil 25 is mounted to the outer periphery of the upper portion of the guide member 11 in FIG. 1, and also to outer peripheries of the sleeve 13 and the stator core 26. The coil 25 is configured to form a magnetic path together with the guide member 11, the movable core 22, the stator core 26, and the like. The coil 25 and the stator core 26 are configured to generate an electromagnetic force resistive to the load of the first spring 23 for the movable core 22 through energization of the coil 25. Note that, an annular spacer 28 made of a non-magnetic material is assembled to the lower end portion of the stator core 26 in FIG. 1.

By the way, in this embodiment, the adjustment core 27 is assembled to the inner periphery of the upper portion of the stator core 26 in FIG. 1 so that the position of the adjustment core 27 is adjustable in the vertical direction. Therefore, the adjustment core 27 is capable of adjusting the mounting load (f1) of the first spring 23. That is, the assembling structure of the adjustment core 27 to the stator core 26 serves as a load adjusting mechanism capable of adjusting the load of the first spring 23.

Further, in this embodiment, the seat member 12 is assembled to the inner periphery of the lower end portion of the guide member 11 in FIG. 1 so that the position of the seat member 12 is adjustable in the vertical direction. In addition, the spacer 28 is assembled to the lower end portion of the stator core 26 in FIG. 1. Therefore, the seat member 12 and the spacer 28 are capable of adjusting a stroke range (movable amount in the axial direction) of the valve element 21 and the movable core 22. That is, the assembling structure of the seat member 12 to the guide member 11 and the spacer 28 serve as a stroke adjusting mechanism capable of adjusting an unseating stroke of the valve element 21 from the valve seat 12c.

Figure 7:
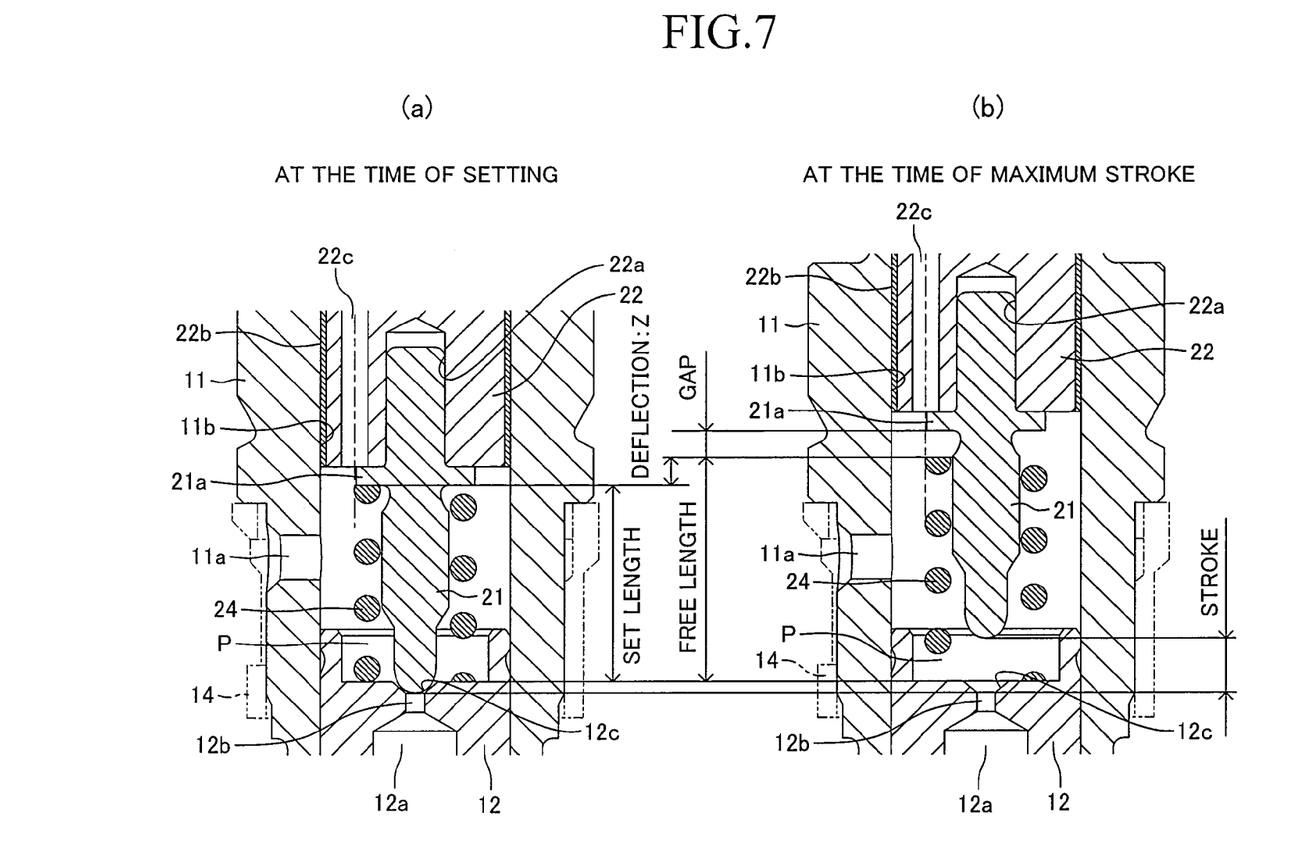
FIGS. 7 are enlarged views of a main part of the normally closed solenoid valve illustrated in FIG. 1, for illustrating an operation of the normally closed solenoid valve.

Further, in this embodiment, the load of the second spring 24 is set to zero (the second spring 24 has a free length) (see FIGS. 7) before the stroke of the valve element 21 from the valve seat 12c becomes the maximum (see FIG. 7(b)). Therefore, under a state of FIG. 7(a) (at the time of setting), the axial length of the second spring 24 is a set length, and the deflection amount of the second spring 24 is a set value Z. Further, under a state of FIG. 7(b) (at the time of maximum stroke), the axial length of the second spring 24 is the free length, and hence a predetermined gap is formed between an upper end of the second spring 24 and the flange section 21a of the valve element 21. In addition, the one end portion side of the valve orifice 12b (upper side of FIG. 7(b), that is, valve seat 12c side) communicates to the inflow port 11a, and another end portion side of the valve orifice 12b (lower side of FIG. 7(b)) communicates to the outflow port 12a.

In the normally closed solenoid valve 100 of this embodiment that is constructed as described above, the valve element 21 and the movable core 22 are assembled to the cylinder section 11b of the housing 10 so as to be integrally movable in the axial direction. Further, the load (f2) of the second spring 24 is smaller than the load (f1) of the first spring 23, and is applied to the valve element 21 and the movable core 22 against the load of the first spring 23.

Therefore, in the normally closed solenoid valve 100 of this embodiment, not only in fluid control for a flow in a self-opening direction, in which the flow direction of the fluid is opposite to that of the above-mentioned embodiment (in this case, the fluid flows from the outflow port 12a to the inflow port 11a in the above-mentioned embodiment), but also in fluid control for the flow in the self-closing direction, in which the fluid flows as in the above-mentioned embodiment (in this case, the fluid flows from the inflow port 11a to the outflow port 12a in the above-mentioned embodiment), the electromagnetic force is generated between the movable core 22 and the stator core 26 through the energization of the coil 25, and the valve element 21 and the movable core 22 integrally move against the load of the first spring 23, with the result that the valve element 21 is unseated from the valve seat 12c.

Figure 2:
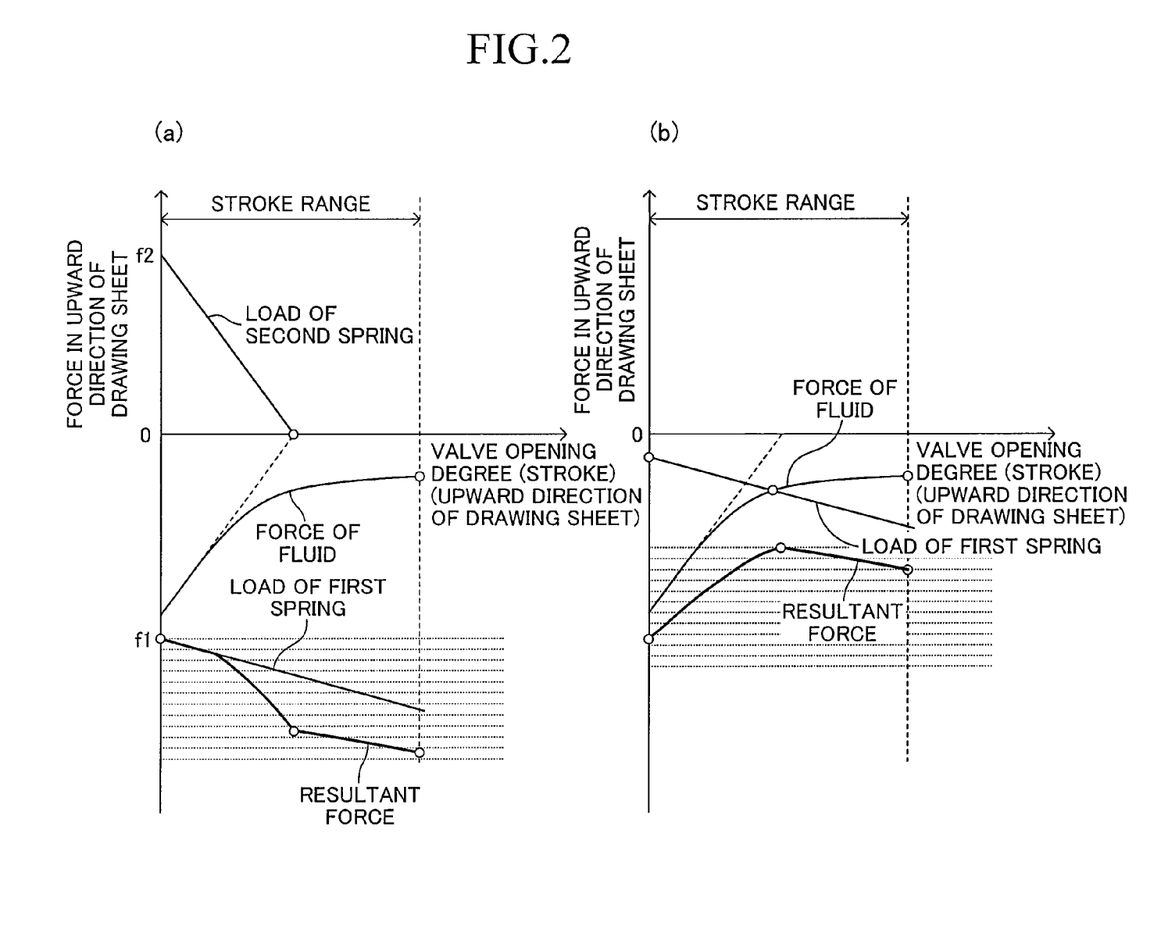
FIG. 2(a) is a graph schematically showing a relationship between a force applied to a valve element and a movable core in an upward direction of the drawing sheet (of the illustration) (force in an unseating direction) and a valve opening degree (stroke in the upward direction of the drawing sheet) in a case where the normally closed solenoid valve illustrated in FIG. 1 is used in fluid control for a flow in a self-closing direction.
FIG. 2(b) is a graph schematically showing a relationship between the force applied to the valve element and the movable core in the upward direction of the drawing sheet (force in the unseating direction) and the valve opening degree (stroke in the upward direction of the drawing sheet) in a case where a normally closed solenoid valve similar to that of FIG. 1 is constructed without a second spring illustrated in FIG. 1 (normally closed solenoid valve of a comparative example) and the normally closed solenoid valve is used in the fluid control for the flow in the self-closing direction.
Figure 3:
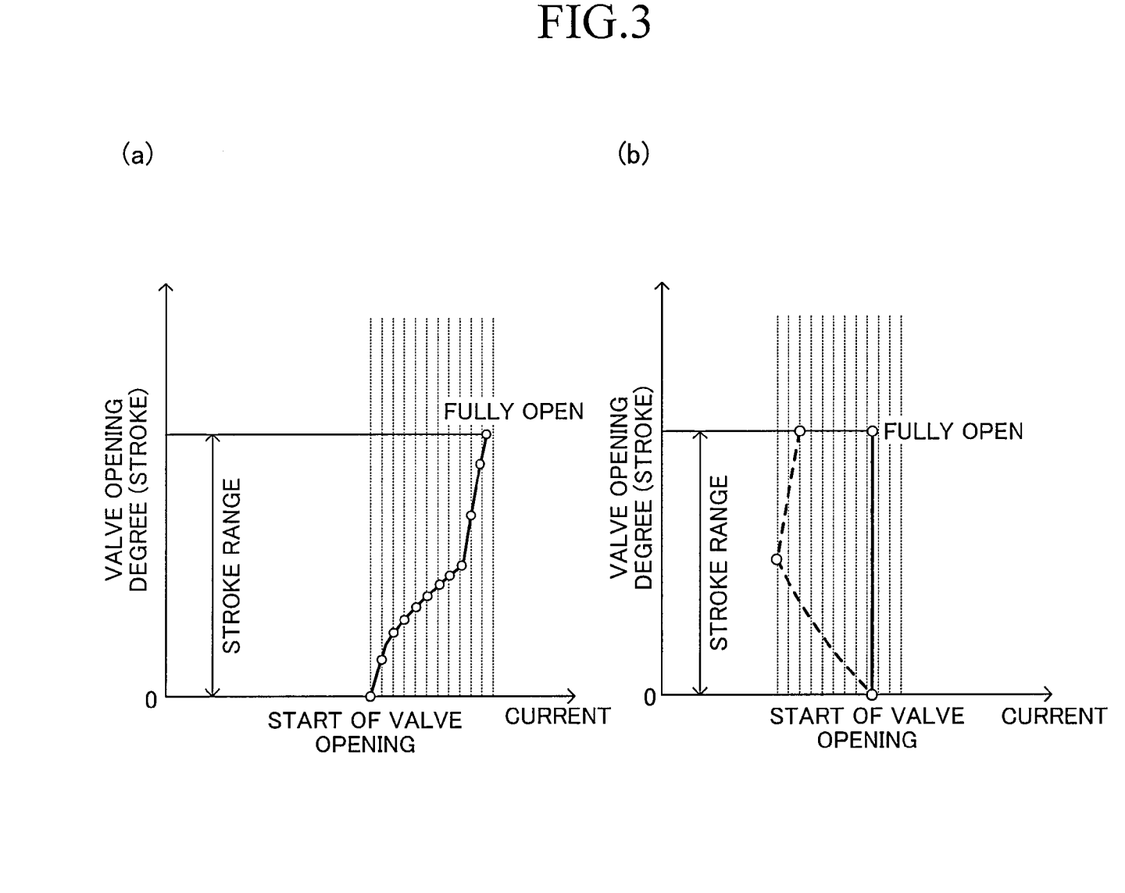
FIG. 3(a) is a graph schematically showing a relationship between a current supplied to a coil and the valve opening degree (stroke) in the case where the normally closed solenoid valve illustrated in FIG. 1 is used in the fluid control for the flow in the self-closing direction.
FIG. 3(b) is a graph schematically showing a relationship between the current supplied to the coil and the valve opening degree (stroke) in the case where the normally closed solenoid valve of the comparative example is used in the fluid control for the flow in the self-closing direction.

By the way, in the fluid control for the flow in the self-closing direction, in which the fluid flows as in the above-mentioned embodiment, a force of the fluid, which is applied to the valve element 21 (force received by the valve element 21 in a seating direction), is sequentially decreased in accordance with increase in valve opening degree as shown in FIG. 2(a), and hence the resultant force applied to the valve element 21 (force in the seating direction obtained by combining the above-mentioned force of the fluid, load of the first spring, load of the second spring, and the like) is sequentially increased in accordance with the increase in valve opening degree as shown in FIG. 2(a). As a result, the resultant force at the time of setting becomes the minimum, and the resultant force at the time of maximum stroke becomes the maximum. Therefore, the relationship between a current supplied to the coil 25 and the valve opening degree (unseating amount of the valve element 21 from the valve seat 12c) becomes as shown in FIG. 3(a), and thus the valve opening degree is sequentially increased (sequentially changed from the state at the start of valve opening to the full open state) in accordance with increase in current. Thus, in this case, the valve opening degree can be controlled by the current supplied to the coil 25.

Note that, in a case where a normally closed solenoid valve similar to that of FIG. 1 is constructed without the second spring 24 illustrated in FIG. 1 (normally closed solenoid valve of a comparative example), when the normally closed solenoid valve is used in the fluid control for the flow in the self-closing direction, the resultant force applied to the valve element 21 (force in the seating direction obtained by combining the above-mentioned force of the fluid and load of the first spring) is sequentially decreased in accordance with the increase in valve opening degree as shown in FIG. 2(b), and is then sequentially increased. As a result, the resultant force at the time of setting becomes the maximum. Therefore, the relationship between the current supplied to the coil 25 and the valve opening degree (unseating amount of the valve element 21 from the valve seat 12c) becomes as shown in FIG. 3(b), and thus the valve opening degree is instantaneously changed to the full open state when the valve opening is started through the increase in current. Thus, in this case, the valve opening degree cannot be controlled by the current supplied to the coil 25.

Figure 4:
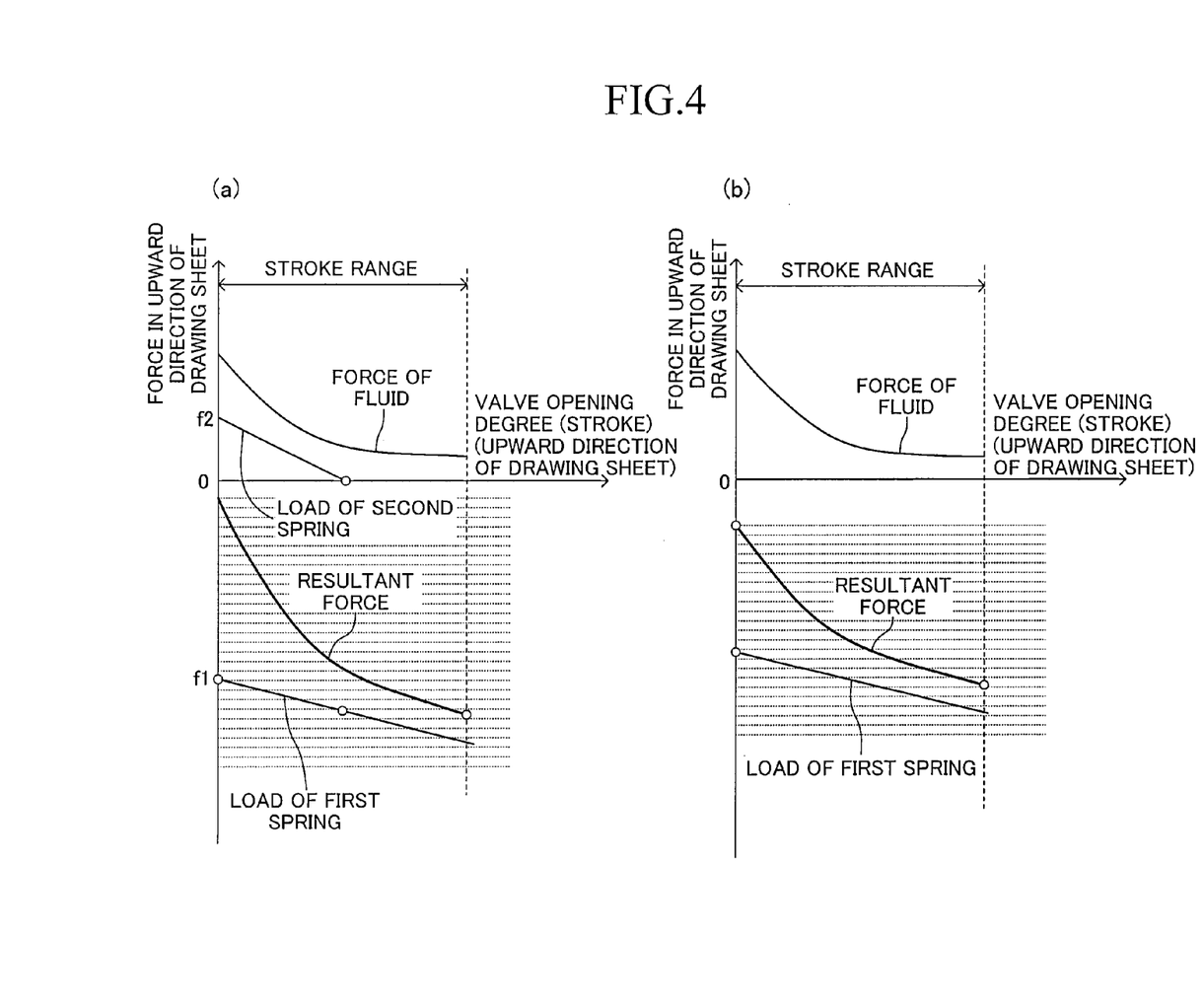
FIG. 4(a) is a graph schematically showing a relationship between the force applied to the valve element and the movable core in the upward direction of the drawing sheet (force in the unseating direction) and the valve opening degree (stroke in the upward direction of the drawing sheet) in a case where the normally closed solenoid valve illustrated in FIG. 1 is used in fluid control for a flow in a self-opening direction.
FIG. 4(b) is a graph schematically showing a relationship between the force applied to the valve element and the movable core in the upward direction of the drawing sheet (force in the unseating direction) and the valve opening degree (stroke in the upward direction of the drawing sheet) in a case where the normally closed solenoid valve of the comparative example is used in the fluid control for the flow in the self-opening direction.
Figure 5:
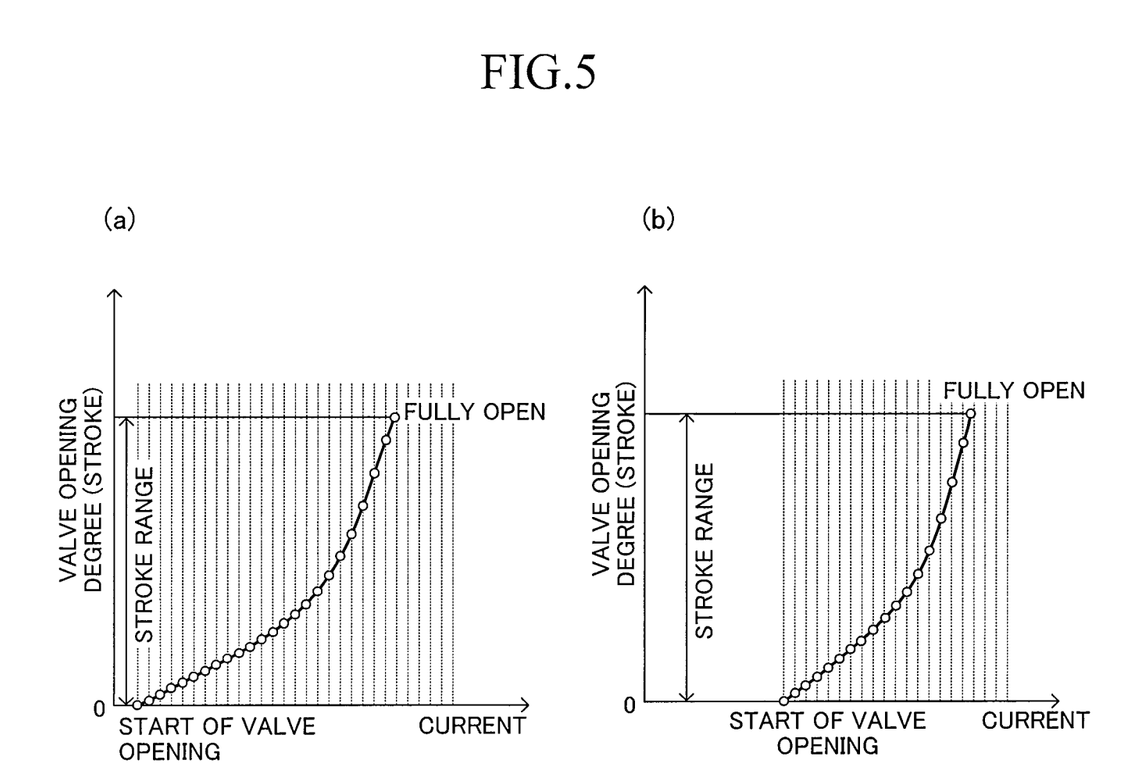
FIG. 5(a) is a graph schematically showing a relationship between the current supplied to the coil and the valve opening degree (stroke) in the case where the normally closed solenoid valve illustrated in FIG. 1 is used in the fluid control for the flow in the self-opening direction.
FIG. 5(b) is a graph schematically showing a relationship between the current supplied to the coil and the valve opening degree (stroke) in the case where the normally closed solenoid valve of the comparative example is used in the fluid control for the flow in the self-opening direction.

In the fluid control for the flow in the self-opening direction, in which the flow direction of the fluid is opposite to that of the above-mentioned embodiment, on the other hand, a force of the fluid, which is applied to the valve element 21 (force received by the valve element 21 in the unseating direction), is sequentially decreased in accordance with the increase in valve opening degree as shown in FIG. 4(a), and hence the resultant force applied to the valve element 21 (force in the seating direction obtained by combining the above-mentioned force of the fluid, load of the first spring, load of the second spring, and the like) is sequentially increased in accordance with the increase in valve opening degree as shown in FIG. 4(a). As a result, the resultant force at the time of setting becomes the minimum, and the resultant force at the time of maximum stroke becomes the maximum. Therefore, the relationship between the current supplied to the coil 25 and the valve opening degree (unseating amount of the valve element 21 from the valve seat 12c) becomes as shown in FIG. 5(a), and thus the valve opening degree is sequentially increased (sequentially changed from the state at the start of valve opening to the full open state) in accordance with the increase in current. Thus, also in this case, the valve opening degree can be controlled by the current supplied to the coil 25.

Note that, in the above-mentioned normally closed solenoid valve of the comparative example), when the normally closed solenoid valve is used in the fluid control for the flow in the self-opening direction, the resultant force applied to the valve element 21 (force in the seating direction obtained by combining the above-mentioned force of the fluid and load of the first spring) is sequentially increased in accordance with the increase in valve opening degree as shown in FIG. 4(b). As a result, the resultant force at the time of setting becomes the minimum, and the resultant force at the time of maximum stroke becomes the maximum. Therefore, the relationship between the current supplied to the coil 25 and the valve opening degree (unseating amount of the valve element 21 from the valve seat 12c) becomes as shown in FIG. 5(b), and thus the valve opening degree is sequentially increased (sequentially changed from the state at the start of valve opening to the full open state) in accordance with the increase in current. Thus, also in this case, the valve opening degree can be controlled by the current supplied to the coil 25, but the resolution (resolution of the stroke with respect to the current) that can be obtained in this case is not excellent unlike the above-mentioned embodiment.

Further, in the normally closed solenoid valve 100 of this embodiment, the above-mentioned load adjusting mechanism (assembling structure of the adjustment core 27 to the stator core 26) is capable of adjusting the load of the first spring 23, and the above-mentioned stroke adjusting mechanism (assembling structure of the seat member 12 to the guide member 11 and the spacer 28) is capable of adjusting the unseating stroke of the valve element 21 from the valve seat 12c. Thus, in the normally closed solenoid valve 100 of this embodiment, not only in the fluid control for the flow in the self-opening direction, but also in the fluid control for the flow in the self-closing direction, the above-mentioned force of the fluid, loads of both the springs 23 and 24, electromagnetic force, and the like are balanced, with the result that fine pressure control and flow control can be performed through fine adjustment using the electromagnetic force (current supplied to the coil 25).

Figure 6:
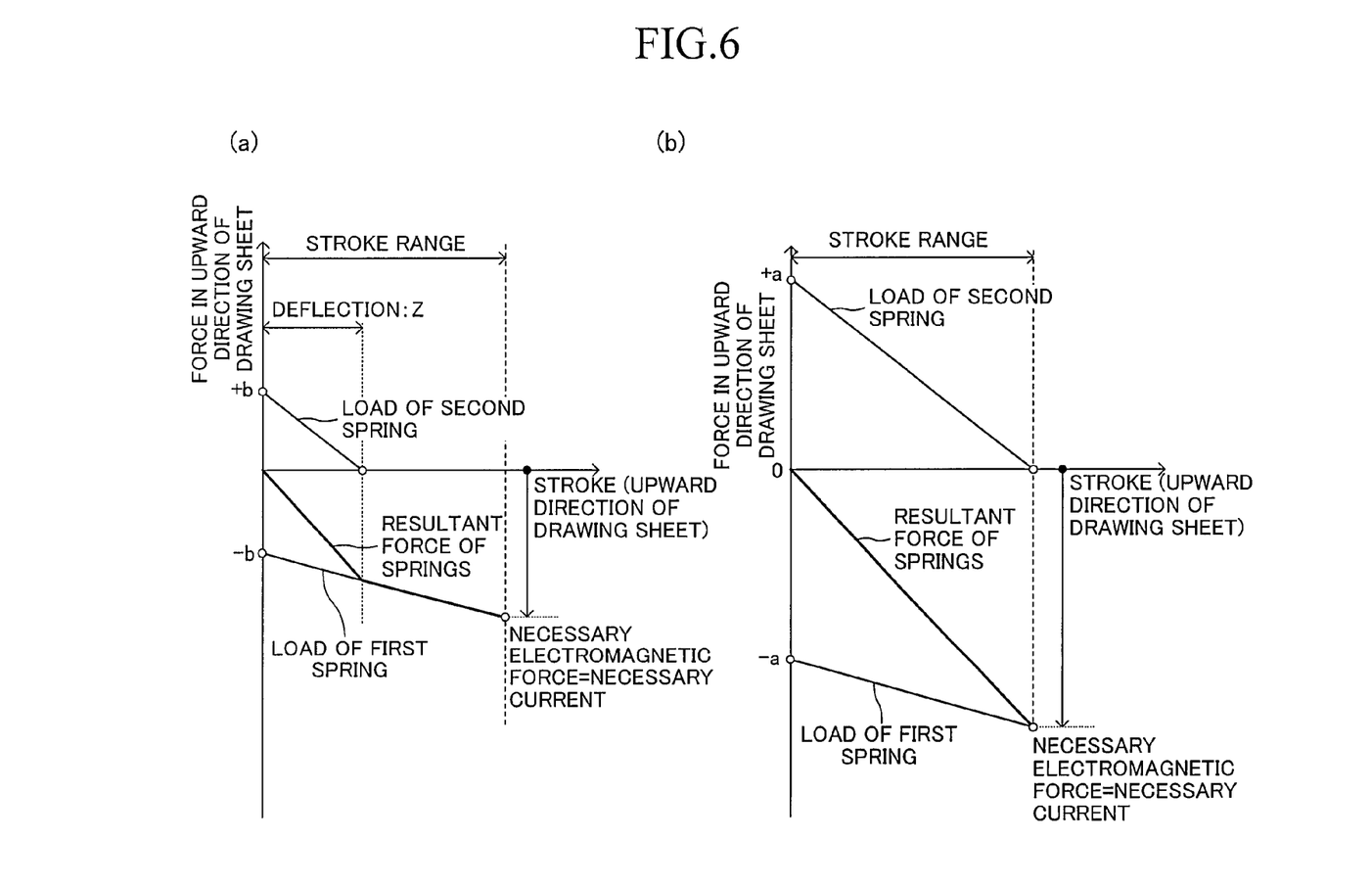
FIG. 6(a) is a graph schematically showing a relationship between an electromagnetic force necessary to obtain the maximum stroke (necessary current) and a relationship between a load of each spring and a stroke (movement amount of the valve element and the movable core in an axial direction) in the normally closed solenoid valve illustrated in FIG. 1.
FIG. 6(b) is a graph schematically showing a relationship between the electromagnetic force necessary to obtain the maximum stroke (necessary current) and the relationship between the load of each spring and the stroke (movement amount of the valve element and the movable core in the axial direction) in a case where the load of the second spring of the normally closed solenoid valve illustrated in FIG. 1 is set to zero at the time of maximum stroke.

Further, in the normally closed solenoid valve 100 of this embodiment, as schematically shown in FIG. 6(a), the load of the second spring 24 is set to zero before the stroke of the valve element 21 from the valve seat 12c becomes the maximum. Therefore, the load of the first spring 23 at the time of maximum stroke can be set lower than, for example, in a case where the load of the second spring is set to zero at the time when the stroke of the valve element from the valve seat becomes the maximum as schematically shown in FIG. 6(b). Thus, the electromagnetic force necessary to obtain the maximum stroke of the valve element 21 and the movable core 22 (necessary current) can be reduced, with the result that the normally closed solenoid valve 100 can be constructed into a power-saving type.

Further, in the normally closed solenoid valve 100 of this embodiment, the one end portion side of the valve orifice 12b (valve seat 12c side) communicates to the inflow port 11a, and the another end portion side of the valve orifice 12b communicates to the outflow port 12a. Therefore, cavitation and erosion may occur at a portion that is a downstream side (inside the valve orifice 12b) with respect to a seal portion (portion at which the valve element 21 is seated on the valve seat 12c), and hence the erosion can be prevented from occurring in the vicinity of the seal portion, with the result that the normally closed solenoid valve 100 can be constructed into an anti-erosion type (damage to the seal portion can be suppressed and the life of the normally closed solenoid valve 100 can therefore be prolonged).

In the normally closed solenoid valve 100 of the above-mentioned embodiment, the present invention is carried out so that the housing 10 includes the guide member 11, the seat member 12, and the sleeve 13. However, the structure of the housing may be changed as appropriate, and is not limited to the structure of the above-mentioned embodiment. Further, in the normally closed solenoid valve 100 of the above-mentioned embodiment, the present invention is carried out so that the load of the second spring 24 is set to zero before the stroke of the valve element 21 from the valve seat 12c becomes the maximum. Alternatively, the present invention may be carried out so that the load of the second spring is set to zero, for example, at the time when the stroke of the valve element from the valve seat becomes the maximum. Thus, the load of the second spring 24 may be set to zero at an appropriate timing.

The invention claimed is:

1. A normally closed solenoid valve, comprising:
   a housing having an inflow port and an outflow port for a fluid, a passage to communicate the inflow port and the outflow port with each other, and a valve orifice formed in the passage with a valve seat arranged at one end portion of the valve orifice;
   a valve element arranged so as to be seatable on and unseatable from the valve seat;
   a movable core arranged inside of a cylinder section of the housing so as to be movable integrally with the valve element in an axial direction of the movable core;
   a first spring configured to bias the valve element and the movable core toward the valve seat;
   a coil and a stator core configured to generate an electromagnetic force resistive to a load of the first spring for the movable core through energization;
   a second spring configured to apply a load smaller than and resistive to the load of the first spring to the valve element and the movable core;
   a load adjusting mechanism to adjust a mounting load of the first spring; and
   a stroke adjusting mechanism to adjust an unseating stroke of the valve element from the valve seat,
   wherein a gap is formed between an end of the second spring and a part of the valve element in a state in which the unseating stroke of the valve element from the valve seat becomes maximum, and the load of the second spring is set to zero before the unseating stroke of the valve element from the valve seat becomes maximum.

2. A normally closed solenoid valve according to claim 1, wherein the one end portion side of the valve orifice communicates to the inflow port, and another end portion side of the valve orifice communicates to the outflow port.

3. A normally closed solenoid valve according to claim 1, wherein the load of the second spring continues to be zero between a state in which the unseating stroke of the valve element from the valve seat reaches a first stroke larger than zero and the state in which the unseating stroke of the valve element from the valve seat becomes maximum.

4. A normally closed solenoid valve according to claim 1, wherein the gap is formed between the end of the second spring and a flange of the valve element in the state in which the unseating stroke of the valve element from the valve seat becomes maximum.

* * * * *